Patented Oct. 20, 1936

2,057,676

UNITED STATES PATENT OFFICE 2,057,676

SYNTHETIC RESIN

George DeWitt Graves, Wilmington, Del., assignor to E. I. du Pont de Nemours & Company, Wilmington, Del., a corporation of Delaware No Drawing. Application April 3, 1935,
Serial No. 14,517

23 Claims. (Cl. 260—2)

This invention relates to resinous materials and more particularly to new and improved polyether resins obtained by reacting certain dihydric phenols and aliphatic polyhalides.

In the application of J. A. Arvin, Serial Number 651,634, filed January 13, 1933, there is disclosed the preparation of a new class of resins described as ether resins. These resins are obtained by reacting polyhydric phenols or certain of their metallic salts with polyhalides whose halogen atoms are attached to different aliphatic carbon atoms joined in turn to other atoms by single bonds only.

I have discovered that if the aliphatic polyhalide is reacted with polynuclear dihydric phenols of the kind described below resins are obtained which have better durability and markedly higher softening temperatures than those heretofore produced. These improvements in the resins of the present type very considerably enhance their utility in the arts.

This invention has as an object the preparation of new and useful resins. A further object is the preparation of new resins of the kind mentioned above which are characterized by higher softening temperatures and by better durability than possessed by the polyether resins previously made. Other objects will appear hereinafter.

The above objects are accomplished by condensing aliphatic polyhalides of the kind described in the above identified application with dihydric phenols which contain at least four carbocyclic nuclei, at least two of which are condensed, and which have their phenolic hydroxyl groups attached to different carbocyclic nuclei. By "condensed nuclei" I mean carbocyclic nuclei having two adjacent carbon atoms of the benzene ring in common, the naphthalene ring being an illustration. The polyhalides just referred to, with which the phenols specified herein are reacted, are organic compounds containing at least two halogen atoms attached to different carbon atoms which are in turn joined to other atoms by single bonds only.

Examples of the phenols of the kind just mentioned are those obtained by condensing naphthanones (the ketones obtained by oxidation or dehydrogenation of completely hydrogenated naphthols) with mononuclear monohydric phenols containing the para position unsubstituted, the preparation of which is described more fully in the application of H. S. Rothrock, Serial No. 5,300, filed February 6, 1935. 2,2-bis(4-hydroxyphenyl) naphthane, a representative phenol of this type, is obtained by condensing one mol. of beta-naphthanone with two mols of phenol and has the formula

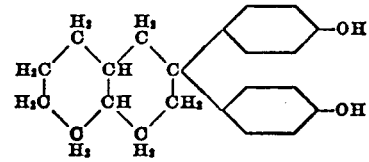

Other instances of phenols conforming to the above definition are those obtained by causing a naphthol to condense with itself in the presence of an oxidizing agent. An example is bis-(beta-naphthol) which is formed by the self-condensation of beta-naphthol in the presence of ferric chloride in an alkaline medium:

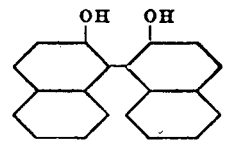

Further examples of the phenols useful in the practice of my invention are those obtained by condensing two mols of naphthol with one mol. of an aldehyde, preferably formaldehyde. An example of a phenol of this kind is bis(2-hydroxynaphthyl)-methane having the formula

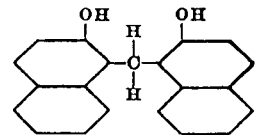

My new resins are preferably made by reacting chemically equivalent quantities of the aliphatic polyhalide and a salt of the polynuclear dihydric phenol. By this, I mean that one mol. of the polynuclear dihydric phenol will require one mol. of the aliphatic dihalide. Variations from chemically equivalent amounts are not precluded, however, but the greater the variation, that is, excess of polyhalide or excess of polynuclear dihydric phenol, the less desirable will be the resin, and if too highly unbalanced ratios are reached a high molecular weight polymer can no longer be obtained.

In the preferred embodiment of this invention, the polynuclear dihydric phenol is mixed with an aqueous solution of the theoretical quantity, or a slight excess, of alkali and heated at a relatively high temperature, above 70° and preferably above 100° C., with an equivalent amount of the aliphatic polyhalide. The apparatus consists of a vessel fitted with a thermometer, reflux condenser, and a stirrer designed to sweep the bottom and sides of the reaction vessel. Heating is continued until the desired state of condensation is obtained, or until as much of the phenol and polyhalide are reacted as possible. The phenol is taken to be largely reacted when the titration value of the mixture remains substantially constant; where the theoretical amount of alkali was originally used, the final product is essentially neutral. Since side reactions occur, this method of following the progress of the resinification reaction is only approximate. The reaction can also be followed by distilling off a few drops of the reaction mixture and examining the cold distillate. If the distillate is cloudy, some of the halide is uncombined and refluxing is continued. When the distillate is clear, the water can be distilled off without loss of halide; this will then permit the use of higher temperatures in the later stages of the reaction with a resultant decrease in the time of preparation. Further heating after the distillate becomes clear is generally necessary, inasmuch as this clear point only shows that essentially all of the halide has combined by elimination of at least one of its halogen atoms, but not necessarily all of them. The final reaction product is generally very viscous, and is opaque because of occluded salts. When the reaction mixture has reached the desired degree of condensation or when its alkalinity approaches constancy, it is taken up while in the reaction vessel with a small amount of an aromatic hydrocarbon solvent, e. g., toluene, poured on to trays while still hot, and most of the toluene distilled off. While still containing a small amount of toluene, the resin is transferred, preferably in molten condition, to a steam-jacketed Werner-Pfleiderer mixer, washed with hot water until salt-free, then treated with dilute hydrochloric acid, and finally washed free of chlorides with hot water. The resin is then dried either in a vacuum oven or at atmospheric pressure in a steam-jacketed Werner-Pfleiderer mixer.

The polyether resins of this invention may also be prepared by reacting the polyhalide with the polyhydric phenol with or without alkali at superatmospheric pressures, either in the presence or absence of an inert diluent.

The following examples are illustrative of the methods used in carrying out my invention. The softening temperatures of the products were measured by the New York Testing Laboratory penetrometer.

Example I

|  | Parts by weight |
|---|---|
| (A) 2,2-bis-(4-hydroxyphenyl)-naphthane | 70.0 |
| (B) $\beta,\beta'$-dichlordiethyl ether | 31.3 |
| (C) Sodium hydroxide (48.3% solution) | 36.7 |
| (D) Water | 50.0 |

Ingredients (A), (C) and (D) were placed in the order named in a reaction vessel, and heated to refluxing temperature with stirring. Ingredient (B) was then added slowly and refluxing continued for 17.5 hours, at the end of which time a few drops were distilled and found to be clear. Water was then distilled off over a period of 1.5 hours, the temperature meanwhile being carried to 225° C. where it was held for 3.5 hours with stirring. The resin was cooled, broken into small pieces, and dissolved in toluene. The solution was filtered, the filtrate neutralized with dilute hydrochloric acid and then washed free of chlorides with hot water. The solid resin was recovered by distillation of the solvent. The product obtained had a softening point of 115–130° C. and had no tendency to be converted on heating to an infusible, insoluble product.

Example II

|  | Parts by weight |
|---|---|
| (A) bis-(2-hydroxynaphthyl)methane | 138.0 |
| (B) Sodium hydroxide (48.3% solution) | 77.8 |
| (C) Water | 99.7 |
| (D) $\beta,\beta'$-dichlordiethyl ether | 66.0 |

Ingredients (A), (B) and (C) were placed in the order named in the reaction vessel and heated to refluxing with stirring. Ingredient (D) was then added slowly and refluxing continued for 23 hours, at the end of which time a test portion of distillate was clear. Water was then distilled off, the temperature allowed to rise to 220° C., where it was maintained for 45 minutes with stirring. The resin was allowed to cool to room temperature, then dissolved in toluene and the solution filtered. The filtrate was washed first with water, second with dilute hydrochloric acid, and finally with water until free of chlorides. The resin was recovered by evaporation of the toluene. A brittle resin softening at 85° C., and which had no tendency to harden to an infusible, insoluble product, was obtained.

The bis-(2-hydroxynaphthyl)methane in the above example was made as follows:

| (A) Beta-naphthol | parts by weight | 300 |
|---|---|---|
| (B) Ethyl alcohol | do | 360 |
| (C) Sodium acetate (crystals) | do | 60 |
| (D) Formaldehyde (37% solution) | cc | 165 |

Ingredients (A), (B) and (C) were mixed in a flask fitted with a stirrer and heated to dissolve the reactants. When the mixture had become homogeneous, ingredient (D) was added at room temperature and the mixture allowed to stand for two days, at the end of which time 1,000 cc. of water was added, the mass broken up, filtered, and washed on the filter with hot water to remove unreacted ingredients. The washed product was transferred to a flask and digested with water, filtered, and purified by repeated recrystallization from ethyl alcohol. The product obtained was a crystalline solid having a melting point of 194–196° C., and was completely soluble in sodium hydroxide.

Example III

|  | Parts by weight |
|---|---|
| (A) Sodium hydroxide (48.3% solution) | 77.8 |
| (B) Water | 99.7 |
| (C) Bis(beta-naphthol) | 121.6 |
| (D) $\beta,\beta'$-dichlordiethyl ether | 66.0 |

Ingredients (A), (B) and (C) were placed in the order named in the reaction vessel and heated to refluxing with stirring. Ingredient (D) was then added slowly, refluxing being continued for 17 hours, at the end of which time a test portion of distillate was clear. Water was then distilled off, the temperature allowed to rise gradually to 220–235° C. and maintained at that point for approximately two hours with stirring. The resin was allowed to cool to room temperature and dissolved in toluene, the solution allowed to stand at room temperature for 48 hours and the clear liquid decanted off from the separated salt. The resin was recovered by evaporation of the solvent and dried by heating it in a vacuum oven at 110° C. for 48 hours. The product obtained was a light colored, brittle solid softening at 80–90° C.

The bis(beta-naphthol) in the above example was made as follows:

| | Parts by weight |
|---|---|
| (A) Beta-naphthol | 100 |
| (B) Sodium hydroxide | 30 |
| (C) Water | 4000 |

Ingredients (A), (B) and (C) were mixed in the order named in a 5 liter flask and heated to boiling. To this solution was then added with stirring a solution of 160 parts by weight of ferric chloride ($FeCl_3 \cdot 6H_2O$) in 300 parts of about 4N-hydrochloric acid, the mixture refluxed for thirty minutes, cooled, filtered, and the precipitate washed with hot water. The washed precipitate was taken up in 70% alcohol, cooled, filtered, and washed with water. The product was purified by repeated recrystallization from alcohol. The purified material was a crystalline solid having a melting point of 210–212° C. and was identified as bis(beta-naphthol).

The phenols mentioned in the examples may be replaced by other phenols corresponding to the definition previously given. Further examples of these phenols are: 2,2-bis(4-hydroxy-3-methylphenyl)naphthane, 2,2-bis(4-hydroxy-2-methylphenyl)naphthane, 2,2-bis(4-hydroxy-3-chlorophenyl)naphthane, 2,2-bis(4-hydroxy-3-propylphenyl)naphthane, bis(1-hydroxynaphthyl)methane (obtained by condensing alpha-naphthol with formaldehyde), bis(2-hydroxy-4-methylnaphthayl)methane, bis(2-hydroxy-3-chloronaphthyl)methane, and bis(alpha-naphthol).

In place of the $\beta,\beta'$-dichlordiethyl ether of the examples, other aliphatic polyhalides containing at least two halogen atoms attached to different carbon atoms which are in turn joined to other atoms by single bonds only may be used. Examples of these include symmetrical dichloroacetone, symmetrical dichloromethyl ether, 2,3-dichlorodioxane, as well as any of the polyhalides disclosed in the mentioned application Serial No. 651,634.

The sodium hydroxide mentioned in the examples may likewise, as also disclosed in the application just referred to, be replaced by lithium or potassium hydroxide or by other alkali metal hydroxides. Alkaline earth metal hydroxides may also be used, but with a lesser degree of success because of the poor solubilities of the phenolic salts.

As previously explained under the general description of my process, it is advantageous to purify my new resins by adding thereto a small amount of toluene while the resin is still in the reaction vessel, then pour the mixture into a heated Werner-Pfleiderer mixer, neutralize with hydrochloric acid, and finally wash the product with hot water until it is salt-free. The resin may then be dried either in a Werner-Pfleiderer mixer or in a vacuum oven. A more specific description of this procedure is as follows:

To the unpurified molten resin of Example I is added 5–10% of toluene. The mixture is poured while still hot into a tray, and the major portion of the toluene removed by heating in a vacuum oven. The resin, while still in a molten condition and containing a small amount of toluene, is poured into a steam-jacketed Werner-Pfleiderer mixer and washed with hot water to remove salt, then washed with dilute hydrochloric acid, and finally washed free of chlorides with hot water. The washed resin is then transferred to a tray and dried overnight in a vacuum oven at temperatures ranging from 100–150° C.

The method just described for obtaining the purified resin is not only unusually efficient but is also noteworthy because of the unusual result achieved. Although the solvent used to plasticize the resins and make them workable in the mixer is volatile, nevertheless the resins retain the solvent so tenaciously that substantially no solvent is lost throughout the washing procedure. This makes it possible to work the resin in the mixer at a substantially lower temperature than is otherwise feasible.

The marked elevation in softening temperature of my new resins as compared to those of known resins, which is obtained as a result of employing a phenol of the very special character described herein, may be illustrated by the following table:

| Resins synthesized from dichlorodiethylether and | Softening temperature |
|---|---|
| | ° C. |
| bis (4-hydroxyphenyl) dimethylmethane | 45–50 |
| bis (beta-naphthol) | 80–90 |
| bis (2-hydroxynaphthyl) methane | 85–90 |
| 2,2-bis (4-hydroxynaphthyl) naphthane | 116–130 |

These higher softening temperatures make it possible to utilize the new resins in applications for which former types of polyether resins were largely unsuited, e. g., all uses in which the resin must withstand moderate heat without deformation. Among these are unsupported films (substitutes for thin transparent sheets of regenerated cellulose); fibers; linings for containers which are to be sterilized; glass substitutes for special uses such as automobile windshields, nursing bottles, household dishes, molded electrical appliances, linings for battery jars, liners for chemical equipment, etc.; dentures; adhesives where the laminated objects are subjected to substantial temperatures such as washable double-textured fabric materials; certain types of molded articles such as pipe-stems, kitchen furniture, etc. In addition to these special uses, my new resins are also suited admirably for most of the uses disclosed in application Serial Number 651,634.

As many apparently widely different embodiments of this invention may be made without departing from the spirit and scope thereof, it is to be understood that I do not limit myself to the specific embodiments thereof except as defined in the appended claims.

I claim:

1. A polyether resin comprising the alkaline condensation product of a polyhydric phenol containing at least four carbocyclic nuclei, at least two of which are condensed, said phenol having the phenolic hydroxyls attached to different carbocyclic nuclei, with an organic polyhalide whose halogen atoms are attached to different carbon atoms which are in turn joined to other atoms by single bonds only.

2. A polyether resin comprising the alkaline condensation product of a dihydric phenol containing four carbocyclic nuclei, two of which are condensed, said phenol having the phenolic hydroxyls attached to different carbocyclic nuclei, with an organic polyhalide whose halogen atoms are attached to different carbon atoms which are in turn joined to other atoms by single bonds only.

3. A polyether resin comprising the reaction product of 2,2-bis(4-hydroxyphenyl)naphthane and an organic polyhalide whose halogen atoms are attached to different carbon atoms which are in turn joined to other atoms by single bonds only.

4. A polyether resin comprising the reaction product of the alkali metal salt of 2,2-bis(4-hydroxyphenyl)naphthane and an organic polyhalide having at least two halogen atoms attached to different carbon atoms which are in turn joined to other atoms by single bonds only.

5. The resinous reaction product of $\beta,\beta'$-dichlorodiethyl ether and the sodium salt of 2,2'-bis(4-hydroxyphenyl)naphthane.

6. A polyether resin comprising the reaction product of bis(2-hydroxynaphthyl)methane and an organic polyhalide whose halogen atoms are attached to different carbon atoms which are in turn joined to other atoms by single bonds only.

7. A polyether resin comprising the reaction product of the alkali metal salt of bis(2-hydroxynaphthyl)methane and an organic polyhalide whose halogen atoms are attached to different carbon atoms which are in turn joined to other atoms by single bonds only.

8. The resinous reaction product of $\beta,\beta'$-dichlorodiethyl ether and the sodium salt of bis(2-hydroxynaphthyl)methane.

9. A polyether resin comprising the reaction product of bis(beta-naphthol) and an organic polyhalide whose halogen atoms are attached to different carbon atoms which are in turn joined to other atoms by single bonds only.

10. A polyether resin comprising the reaction product of the alkali metal salt of bis(beta-naphthol) and an organic polyhalide whose halogen atoms are attached to different carbon atoms which are in turn joined to other atoms by single bonds only.

11. The resinous reaction product of $\beta,\beta'$-dichlorodiethyl ether and the sodium salt of bis(beta-naphthol).

12. The process of synthesizing ether resins which comprises heating in polymerizing proportions in an alkaline medium a polynuclear polyhydric phenol containing at least four carbocyclic nuclei, at least two of which are condensed, said phenol having the phenolic hydroxyls attached to different carbocyclic nuclei, with an organic polyhalide whose halogen atoms are attached to different carbon atoms which are in turn joined to other atoms by single bonds only.

13. The process of synthesizing ether resins which comprises heating in polymerizing proportions in an alkaline medium a polynuclear dihydric phenol containing four carbocyclic nuclei, two of which are condensed, said phenol having the phenolic hydroxyls attached to different carbocyclic nuclei, with an organic polyhalide whose halogen atoms are attached to different carbon atoms which are in turn joined to other atoms by single bonds only.

14. The process of synthesizing polyether resins which comprises heating in polymerizing proportions in an alkaline medium 2,2-bis(4-hydroxyphenyl)naphthane and an organic polyhalide whose halogen atoms are attached to different carbon atoms which are in turn joined to other atoms by single bonds only.

15. The process of synthesizing polyether resins which comprises heating in polymerizing proportions in an alkaline medium the alkali metal salt of 2,2-bis-(4-hydroxyphenyl)naphthane and an organic polyhalide whose halogen atoms are attached to different carbon atoms which are in turn joined to other atoms by single bonds only.

16. The process of synthesizing polyether resins which comprises heating in polymerizing proportions $\beta,\beta'$-dichloro-diethyl ether and the sodium salt of 2,2' bis(4-hydroxyphenyl)naphthane.

17. The process of synthesizing polyether resins which comprises heating in polymerizing proportions bis(2-hydroxynaphthyl)methane and an organic polyhalide whose halogen atoms are attached to different carbon atoms which are in turn joined to other atoms by single bonds only.

18. The process of synthesizing polyether resins which comprises heating in polymerizing proportions the alkali metal salt of bis(2-hydroxynaphthyl)methane and an organic polyhalide whose halogen atoms are attached to different carbon atoms which are in turn joined to other atoms by single bonds only.

19. The process of synthesizing ether resins which comprises heating in polymerizing proportions $\beta,\beta'$-dichloro-diethyl ether and the sodium salt of bis(2-hydroxynaphthyl)methane.

20. The process of synthesizing polyether resins which comprises heating in polymerizing proportions bis(beta-naphthol) and an organic polyhalide whose halogen atoms are attached to different carbon atoms which are in turn joined to other atoms by single bonds only.

21. The process of synthesizing polyether resins which comprises heating in polymerizing proportions the alkali metal salt of bis(beta-naphthol) and an organic polyhalide whose halogen atoms are attached to different carbon atoms which are in turn joined to other atoms by single bonds only.

22. The process of synthesizing ether resins which comprises heating in polymerizing proportions $\beta,\beta'$-dichloro-diethyl ether and the sodium salt of bis(beta-naphthol).

23. The process of synthesizing polyether resins which comprises reacting in polymerizing proportions a dihydric phenol having four carbocyclic nuclei, two of which are condensed, and an organic polyhalide whose halogen atoms are attached to different carbon atoms which are joined in turn to other atoms by single bonds only, adding volatile organic solvent to the reaction product, kneading the resin in a heated internal type mixer, while first neutralizing with acid and then washing with water until free of salt.

GEORGE DEWITT GRAVES.